United States Patent [11] 3,625,751

[72] Inventor Wilhelm E. Walles
 Midland, Mich.
[21] Appl. No. 773,969
[22] Filed Nov. 6, 1968
[45] Patented Dec. 7, 1971
[73] Assignee The Dow Chemical Company
 Midland, Mich.
 Continuation-in-part of application Ser. No. 686,715, Nov. 29, 1967, now abandoned. This application Nov. 6, 1968, Ser. No. 773,969

[54] TRANSPARENT ASTATIC PLASTIC ARTICLES HAVING AMMONIUM SULFONIC ACIDS GROUPS ON THE SURFACE THEREOF AND METHOD FOR THEIR PRODUCTION
6 Claims, No Drawings
[52] U.S. Cl. .................................................. 117/118,
 117/62, 117/138.8 U, 117/139.5 CI
[51] Int. Cl. .................................................. B44d 5/12,
 B32b 27/06

[50] Field of Search............................................ 117/138.8
 U, 139.5 I, 62, 118

[56] References Cited
 UNITED STATES PATENTS
2,727,831 12/1955 Dixon............................ 117/62
2,832,698  4/1958 Walles........................... 117/69
2,937,066  5/1960 Walles........................... 8/4

Primary Examiner—William D. Martin
Assistant Examiner—J. E. Miller, Jr.
Attorneys—Griswold & Burdick, Richard G. Waterman, Lester J. Dankert and Benjamin G. Colley ABSTRACT: A method for the rapid rendering of transparent polymer articles astatic by treating the articles with dilute gaseous sulfur trioxide followed by treatment with ammonia and water or dilute aqueous ammonia. The articles are rendered permanently astatic without affecting their transparency by this process.

TRANSPARENT ASTATIC PLASTIC ARTICLES HAVING AMMONIUM SULFONIC ACIDS GROUPS ON THE SURFACE THEREOF AND METHOD FOR THEIR PRODUCTION

CROSS REFERENCES

This application is a continuation-in-part of Ser. No. 686,715 filed Nov. 29, 1967 now abandoned.

BACKGROUND OF INVENTION

This invention relates to the vapor-phase sulfonation and neutralization of solid, transparent, resinous polymers to render the surfaces thereof astatic.

It is known from U.S. Pat. No. 2,727,831, that articles of polystyrene can be rendered astatic by liquid-phase sulfonation with concentrated sulfuric acid or fuming sulfuric acid followed by treatment with an alkali.

This prior art process has various defects in that the sulfonation treatment is slow since the acid has to be drained off the polymer surface for several minutes and then washed with water to remove all traces of the acid. Furthermore, the prior art sulfonation process sometimes renders the polymer yellow or brown and this requires an additional step of bleaching to remove the discoloration. Finally, this prior art sulfonation process has to be run at a relatively high temperature of from about 55° C. to about 90° C.

SUMMARY OF INVENTION

It has now been found that articles produced from solid, transparent, resinous polymers can be treated with gaseous sulfur trioxide in an inert diluent and neutralized with an ammoniacal agent to produce articles rapidly which are not discolored by the treatment and have a permanent astatic surface which is distortion free, i.e. not visibly altered from the surface prior to treatment.

The present process is thus of utility in manufacturing operations where speed and clarity is essential as for example in the mass production of astatic clear plastic convertible automobile rear windows, dashboard covers, clock face covers, marine plastic windows, helmet visors, and instrument lenses.

DETAILED DESCRIPTION

The transparent polymers to which this invention is applicable are those known to the art and are preferably copolymers of styrene with polymerizable unsaturated, substituted or unsubstituted hydrocarbon, comonomers. In general, the substituted hydrocarbon comonomers will be substituted by chlorine, cyano, alkanoic acyl groups of 1–4 carbon atoms, alkanoic acyloxy groups of 1–4 carbon atoms and carboalkoxy groups of 1–4 carbon atoms. Nonlimiting examples of the substituted unsaturated hydrocarbon comonomers are vinyl chloride, vinylidene chloride, chloroprene, vinyl acetate, vinyl propionate, vinyl butyrate, methyl acrylate, methyl methacrylate, acrylonitrile, methacrylonitrile, maleic anhydride, n-propyl vinyl ketone, methyl vinyl ketone, methyl isopropenyl ketone and vinylidene cyanide. Nonlimiting examples of unsubstituted unsaturated comonomers are ethylene, propylene, isobutylene, 1,3-butadiene and isoprene.

A preferred class of styrene copolymers are the ones prepared by copolymerizing about 70–80 percent by weight of styrene with about 20–30 percent of acrylonitrile since these copolymers are noted for their clarity, strength, toughness, and stress crack resistance.

Other transparent polymers to which this invention is applicable are cellophane, cellulose ethers, cellulose esters, polyvinyl butyral, polyalkyl methacrylates, polyalkyl acrylates, polymethyl pentenes, polyvinylchloride and polyphenylene oxide.

This invention is also applicable to transparent copolymers such as the copolymers of vinyl esters and vinyl halides and the partially neutralized copolymer of ethylene and acrylic acid.

The process involves the vapor-phase treatment of the above polymers with sulfur trioxide in an inert diluent such as sulfur dioxide, nitrogen, air, carbon dioxide. The amount of sulfur trioxide used in the sulfonation step is such that the volume percent of sulfur trioxide in the inert diluent is in the range from about 0.1 to 10 volume-percent.

The time of contact of the polymer with the sulfonation agent is variable depending upon the concentration and the temperature as is well know to those skilled in the art. Generally, the contact time will vary from 1 to 100 seconds when operating within the above concentration range.

The temperature at which the sulfonation step takes place is not critical and can vary from −20° C. to about 100 C. It is of course, obvious, that at the lower end of the operable temperature range, the higher contact times are used.

Generally speaking, the preferred ranges are: temperature about 10°–30° C.; contact time 5 to 50 seconds; concentration 1 to 5 volume-percent of sulfur trioxide.

It is essential to control the sulfonation step within the ranges outlined above since if the polymer is oversulfonated as by using too high a concentration for too long a time, too much swelling in contact with water occurs which damages the glossy surface of the transparent polymer. On the other hand, too little sulfonation is to be avoided since the polymer then does not have the requisite amount of sulfonic groups attached to it which when neutralized will give the surface the desired permanent astatic effect. Also, some materials are not uniformly sulfonated, i.e. are streaked when too little sulfonation is used.

The second step in this invention involves neutralization of the sulfonated surface. This is accomplished by contacting the sulfonated surface or surfaces with an ammoniacal agent. For the purposes of this invention, these terms are defined as ammonia gas or an aqueous solution of ammonia. It is essential that if the neutralization is accomplished by contacting the sulfonated polymer with gaseous ammonia that an additional step be performed—contacting the neutralized, sulfonated copolymer with steam or water as by spraying, dipping or wiping the copolymer surfaces. It is possible also to use a mixture of steam and gaseous ammonia for the neutralization.

Alternatively, the sulfonated polymer can be sprayed, dipped or wiped with a dilute aqueous solution of ammonia.

In the preferred vapor-phase neutralization of the sulfonated polymer, the ammonia gas can be present in an amount of 0.1 to 100 volume-percent in an inert diluent such as air or nitrogen.

The temperature at which this neutralization reaction is performed can range from −20° C. to 90° C. with 25° C. being preferred with a contact time of about 1 to 100 seconds.

In the liquid-phase neutralization aspect of this invention, the ammonia is present in the aqueous media in a concentration of about 0.1 to 35 weight-percent based on the weight of the water.

The apparatus used in this invention is not critical. The vapor-phase sulfonation and neutralization steps can be performed manually in open top dipping tanks. Where the sulfonating mixture is heavier than air as with carbon dioxide and sulfur trioxide, the tank can be upright. Where the neutralization mixture is lighter than air as with ammonia and air, the tank can be inverted. For large volume production, the molded parts of polymer can be suspended on a moving conveyor which passes through a sulfonation treatment box followed by an intermission box for air cleaning and then a gaseous ammonia neutralization treatment box followed by submersion or spraying with water.

The process of this invention results in a polymer having a surface rendered permanently astatic. The polymer is believed to be rendered astatic by the presence of a plurality of ammonium sulfonic acid groups which are permanently attached by chemical bonds to the carbon atoms of the polymer. A plurality of ammonium sulfonic acid groups is intended to mean an amount from about 0.001 to 10 milligrams of ammonium sulfonic acid groups per square centimeter of treated polymer surface. The preferred range is from about 0.002 to 0.010 milligrams per square centimeter. These ammonium sulfonic acid groups absorb and retain water molecules by coordinate bonding so that water is chemically retained even after prolonged drying. This results in a polymer surface in which the static charges leak off or are never formed and hence no static dust buildup is observed.

The astatic quality of the polymers produced by this invention can be demonstrated by a simple "ash" test. In this test, the surface of the plastic article is rubbed with a dry woolen cloth for a few seconds to develop an electrostatic charge. When this charged plastic is held about one-half inch above a quantity of comminuted cigarette ashes, the untreated polymer surface normally attracts and holds the ashes tenaciously and results in a dirty appearance. Polymer surfaces or small areas of polymer surfaces that have been treated by the present invention are not charged by rubbing and do not attract any ashes at all. Thus, the products of this process all pass the ash test.

If desired, the dilute aqueous ammonia bath mentioned above can be substituted by an aqueous bath of an antistatic agent containing a basic nitrogen atom in its molecule. Examples of these nitrogen containing antistatic agents are set forth in U.S. Pat. No. 2,832,696 issued on Apr. 29, 1958 which disclosure is incorporated by reference herein.

The following examples are presented to illustrate but not in any manner limit the invention.

EXAMPLE 1

A clear, molded piece of styrene-acrylonitrile having substantially 72 percent by weight styrene and 28 percent by weight of acrylonitrile and a melt flow of 4.0 as determined by condition I of ASTM D-1238-65T, a tensile strength of 10,000 pounds f./in.$^2$ (ASTM D-638-61T) a Izod impact strength of 0.40 ft. pound f./in. of notch (ASTM D-256-56) and a specific gravity of 1.08 (ASTM D-792-60T) was dipped into a glass-walled tank containing about 3 percent sulfur trioxide in an atmosphere of carbon dioxide maintained at 25° C. with agitation provided by means of electric stirrers.

The piece was held in this tank for 30 seconds and then placed in a glass-walled tank containing about 5 percent by weight of ammonia in air. Contact time in this bath was 30 seconds.

As the final step, the piece was dipped into a water bath and dried.

It was found that the so-treated piece would not pick up ashes by the aforementioned ash test and thus was rendered substantially completely astatic. This was further proved by the surface resistivity of the piece. Thus, when 500 volts DC is applied to two electrodes two centimeters in length spaced two centimeters apart and clamped to the copolymer at room temperature and at 80 percent relative humidity, the surface resistivity was found to be $10^6-10^{10}$ ohm per square depending on the severity of the treatment. In contrast to this, an untreated sample had a value of $10^{12}-10^{14}$ ohm per square.

EXAMPLE 2

The procedure set forth in example 1 was followed except that in place of the ammonia-air bath and water bath an aqueous solution of 1 percent by weight of ammonia was used. The test results were the same showing that these alternative steps are operable.

EXAMPLES 3-7

Following the procedure of example 1, plaques (4×11×⅛ inches) of the following polymers were treated with 2 percent sulfur trioxide in carbon dioxide for 1 minute and then with 2 percent aqueous ammonia. These samples were then tested by the foregoing procedure for their surface resistance at 23° C. and 50 percent relative humidity.

The results are given in table I.

TABLE I

| Examples | Polymer | Resistance (ohms/square) | |
|---|---|---|---|
| | | Before sulfonation | After sulfonation |
| 3 | Surlyn A [1] | 3×10$^{13}$ | 2×10$^9$ |
| 4 | Polymethyl methacrylate | 5×10$^{13}$ | 3.5×10$^9$ |
| 5 | Polyvinyl butyral | 2×10$^{10}$ | 1.4×10$^7$ |
| 6 | Polyvinyl chloride | 3×10$^{10}$ | 4×10$^8$ |
| 7 | Cellophane [2] | 4×10$^8$ | 2×10$^7$ |

[1] Partially neutralized copolymer of ethylene and acrylic acid.
[2] 2 mil film.

NOTE.—In each of the foregoing runs, the surface resistance can be further reduced by a factor of about ten by doubling the sulfur trioxide concentration or by doubling the sulfonation time.

EXAMPLE 8

It was found that when a temperature-sensitive experiment is set up to run in the laboratory for a relatively long period of time such as days or weeks and this experiment is monitored or controlled by a temperature-indicating thermocouple having a molded polymethyl methacrylate cover, the experiment is sometimes ruined by the janitorial staff wiping the plastic covers to remove accumulated dust. This is due to the fact that the electrostatic charge built up by the wiping is enough to attract (or repell) the delicate indication needle of the instrument. In one instance, the true reading of 25° C. was changed to 150° C. by a brisk rubbing. This problem has led to the replacement of the plastic covers with glass covers. This substitution solves this electrostatic problem but introduces the problem of breakage.

The problem was solved by the procedure set forth below.

Six molded polymethyl methacrylate covers for a temperature-indicating thermocouple were removed from the instruments and sulfonated for 2 minutes in 2 percent sulfur trioxide diluted with carbon dioxide, dipped into a 2 percent aqueous solution of ammonia and dried.

Upon reassembling these covers back on the instrument, it was found that the covers were not distorted and that it was impossible to give the treated covers an electrostatic charge by a brisk rubbing with a wiping cloth. Hence, the needle indicating the temperature of the thermocouple remained constant and accurate.

A control set of six untreated covers were given the same brisk rubbing with a wiping cloth and produced false readings due to the electrostatic charge on the cover attracting (or repelling) the needle of the instrument.

This invention is notable in that the process is fast and does not result in any visible change in the gloss and color of the plastic substrate yet it is rendered permanently astatic.

I claim:

1. A process for the rendering of a solid transparent article of a copolymer of from about 70 to about b 80 weight-percent of styrene and from about 80 to about 30 weight-percent of a copolymerizable, unsaturated substituted hydrocarbon monomer permanently astatic without affecting its transparency which comprises (a) contacting the surfaces of said article with gaseous sulfur trioxide in an inert gaseous diluent, the concentration of sulfur trioxide in the inert diluent being in the range from about 0.1 to about 10 volume-percent and (b) neutralizing the resulting sulfonated article with an ammoniacal agent selected from the group consisting of gaseous ammonia and an aqueous solution of ammonia, with the proviso that when said agent is gaseous ammonia it be employed in combination with water, whereby an amount of between about 0.001 and 10 milligrams of ammonium sulfonic acid groups per square centimeter are produced on the surface of said article, said ammonium sulfonic acid groups being chemically bonded to said surface.

2. A process for the rendering of a solid transparent article of a polymer of at least 70 weight-percent styrene permanently astatic which comprises (a) contacting the surfaces of said article with gaseous sulfur trioxide in an inert gaseous diluent, the concentration of sulfur dioxide in the inert diluent being in the range from about 0.1 to about 10 volume-percent; and (b) neutralizing said sulfonated article with an ammoniacal agent selected from the group consisting of gaseous ammonia and an aqueous solution of ammonia with the proviso that when said agent is gaseous ammonia it be employed in combination with water, whereby an amount of between about 0.001 and 10 milligrams of ammonium sulfonic acid groups per square centimeter are produced on the surface of said article, said ammonium sulfonic acid groups being chemically bonded to said surface.

3. A transparent astatic article of a polymer of at least 70 weight-percent of styrene having on its surface a plurality of ammonium sulfonic acid groups chemically bonded to said surface in an amount between about 0.001 and 10 mg. of said groups per cm.$^2$ of surface.

4. The astatic article as set forth in claim 3 wherein the polymer is a copolymer of styrene and olefinically unsaturated substituted monomer which is substituted by a member of the groups consisting of chlorine, cyano, alkanoic acyl groups of 1–4 carbon atoms, alkanoic acyloxy groups of 1–4 carbon atoms and carboalkoxy groups of 1–4 carbon atoms.

5. A transparent astatic article of a copolymer of from about 70 to about 80 percent by weight of styrene and from about 30 to about 20 percent by weight of an unsaturated, substituted hydrocarbon comonomer, said article having on its surface a plurality of ammonium sulfonic acid groups chemically bonded to said surface in an amount between about 0.001 and 10 mg. of said groups per square centimeter of surface, said substituted hydrocarbon comonomer being substituted by a member of the group consisting of chlorine, cyano, alkanoic acyl groups of 1 to 4 carbon atoms, alkanoic acyloxy groups of one to four carbon atoms and carboalkoxy groups of 1 to 4 carbon atoms.

6. An article as set forth in claim 5 in which the copolymer comprises 72 percent by weight of styrene and 28 percent by weight of acrylonitrile.

* * * * *

UNITED STATES PATENT OFFICE
CERTIFICATE OF CORRECTION

Patent No. 3,625,751　　　　　　Dated 7 December 1971

Inventor(s) Wilhelm E. Walles

It is certified that error appears in the above-identified patent and that said Letters Patent are hereby corrected as shown below:

In column 2, line 18, delete "about" and insert --above--.

In column 4, line 55, delete "b"; in line 56 delete "80" and insert --20--.

Signed and sealed this 20th day of June 1972.

(SEAL)
Attest:

EDWARD M. FLETCHER, JR.　　　　ROBERT GOTTSCHALK
Attesting Officer　　　　　　　　Commissioner of Patents